J. ANDERSSON.
APPARATUS FOR COOLING MILK.
APPLICATION FILED FEB. 23, 1912.

1,050,782.

Patented Jan. 21, 1913.

WITNESSES
Carl O. Sahlberg
Ellen Erikson.

INVENTOR
Johan Andersson

UNITED STATES PATENT OFFICE.

JOHAN ANDERSSON, OF SÄLBODA, SWEDEN, ASSIGNOR TO UTLANDSKA PATENTAKTIE-BOLAGET FRIGATOR, OF STOCKHOLM, SWEDEN.

APPARATUS FOR COOLING MILK.

1,050,782. Specification of Letters Patent. Patented Jan. 21, 1913.

Application filed February 23, 1912. Serial No. 679,463.

*To all whom it may concern:*

Be it known that I, JOHAN ANDERSSON, a subject of the King of Sweden, residing at Sälboda, in the Province of Vermland and Kingdom of Sweden, have invented a new and useful Apparatus for Cooling Milk, of which the following is a specification.

Figure 1:
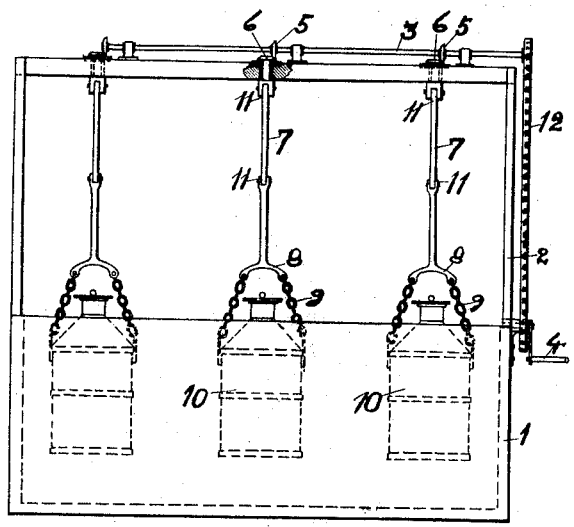
Figure 2:
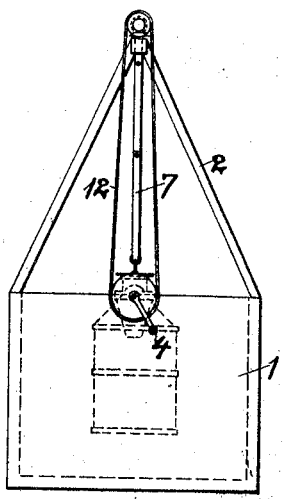

The herein described invention relates to an apparatus for cooling milk, and is shown in the accompanying drawing, Figure 1 being a longitudinal view and Fig. 2 a transverse view.

1 represents a cooling water tank, upon which is placed a support 2, for carrying the milk vessels and the means for rotating same. At the upper part of the support a shaft 3 is journaled in bearings resting on the support, said shaft being in driving connection with the pin of a crank with handle 4, the connection being effected by means of wheels and chains 12 or any other suitable arrangement. The shaft 3 carries several bevel gears 5, these gears being in driving connection with other bevel gears 6 fixed at the upper ends of vertical shafts 7, the other ends of which are provided with sidewise extending arms 8, from which the milk vessels 10 are suspended by means of chains 9, as shown in Fig. 1. The shafts 7 revolve in bushings arranged in the upper part of support 2 and held in place by means of top collars for the purpose of supporting bevel gears 6 and shafts 7, the latter being provided with joints 11 in order to facilitate the lifting of the milk vessels up to the upper edge of the cooling water tank before unhooking the chains.

I claim—

In an apparatus for cooling milk the combination of a water tank, a support arranged above the tank and fixed to same, a shaft journaled on the support and provided with bevel gears, shafts vertically suspended and provided with bevel gears at their upper ends, and chains fixed to said shafts and carrying milk containing vessels.

JOHAN ANDERSSON.

Witnesses:
CARL O. SAHLBERG,
ELLEN ERIKSON.